(12) United States Patent
Chavdar

(10) Patent No.: US 8,461,064 B2
(45) Date of Patent: *Jun. 11, 2013

(54) FRICTION MEMBER AND FRICTION MATERIAL THEREOF

(75) Inventor: Bulent Chavdar, Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/971,108

(22) Filed: Dec. 17, 2010

(65) Prior Publication Data

US 2012/0028035 A1 Feb. 2, 2012

Related U.S. Application Data

(63) Continuation-in-part of application No. 12/845,903, filed on Jul. 29, 2010.

(51) Int. Cl.
*B32B 5/02* (2006.01)
*B32B 15/22* (2006.01)
*B32B 5/24* (2006.01)

(52) U.S. Cl.
USPC ...... 442/179; 442/152; 442/153; 428/311.11; 428/311.51; 428/311.71

(58) Field of Classification Search
USPC .................. 442/179, 152, 153; 428/311.11, 428/311.51, 311.71
See application file for complete search history.

(56) References Cited

U.S. PATENT DOCUMENTS

| 2,280,240 | A | 2/1921 | Kathe |
| 2,381,911 | A | 8/1945 | Kathe |
| 4,173,681 | A | 11/1979 | Durrieu et al. |
| 4,256,801 | A | 3/1981 | Chuluda |
| 4,743,634 | A | 5/1988 | Royer |
| 5,083,650 | A | 1/1992 | Seiz et al. |
| 5,230,952 | A | 7/1993 | McCord |
| 5,478,642 | A | 12/1995 | McCord |
| 5,629,101 | A | 5/1997 | Watremez |

(Continued)

FOREIGN PATENT DOCUMENTS

| EP | 0292997 B1 | 11/1988 |
| EP | 1039168 A1 | 9/2000 |

(Continued)

OTHER PUBLICATIONS

PCT Search Report dated May 10, 2012 for PCT/US2011/065481 filed Dec. 16, 2011.

(Continued)

*Primary Examiner* — Matthew Matzek
(74) *Attorney, Agent, or Firm* — Quinn Law Group, PLLC

(57) ABSTRACT

A friction material includes a resin and a fibrous base material impregnated with the resin. The fibrous base material has a single ply, and includes a plurality of aramid fibers present in a first amount, a plurality of polyacrylonitrile-based carbon fibers present in a second amount that is less than the first amount, and diatomaceous earth present in a third amount that is greater than the first amount. The fibrous base material is substantially free from activated carbon. A friction member for operatively contacting a lubricated surface includes a substrate and a friction material. The friction material defines a first surface bonded to the substrate and a second surface configured for operatively contacting the lubricated surface.

20 Claims, 1 Drawing Sheet

U.S. PATENT DOCUMENTS

| | | | |
|---|---|---|---|
| 5,670,231 | A | 9/1997 | Ohya et al. |
| 5,707,905 | A | 1/1998 | Lam et al. |
| 5,753,356 | A | 5/1998 | Lam et al. |
| 5,775,468 | A | 7/1998 | Lam et al. |
| 5,856,244 | A | 1/1999 | Lam et al. |
| 5,879,791 | A * | 3/1999 | Kato et al. .................. 428/295.1 |
| 5,958,507 | A | 9/1999 | Lam et al. |
| 5,965,658 | A | 10/1999 | Smith et al. |
| 5,989,390 | A | 11/1999 | Lee |
| 5,998,307 | A | 12/1999 | Lam et al. |
| 6,001,750 | A | 12/1999 | Lam |
| 6,013,696 | A | 1/2000 | Hill et al. |
| 6,121,168 | A | 9/2000 | Irifune et al. |
| 6,130,176 | A | 10/2000 | Lam |
| 6,182,804 | B1 * | 2/2001 | Lam ......................... 188/251 A |
| 6,194,059 | B1 | 2/2001 | Yesnik |
| 6,365,222 | B1 | 4/2002 | Wagner et al. |
| 6,458,466 | B1 | 10/2002 | Jones et al. |
| 6,630,416 | B1 | 10/2003 | Lam et al. |
| 6,667,103 | B1 | 12/2003 | Mori et al. |
| 6,667,104 | B2 | 12/2003 | Aiba et al. |
| 6,875,711 | B2 | 4/2005 | Chen et al. |
| 7,008,498 | B2 | 3/2006 | Lamport |
| 7,070,835 | B2 | 7/2006 | Burns |
| 7,175,921 | B2 | 2/2007 | Hatono et al. |
| 7,249,663 | B2 | 7/2007 | Mordukhovich et al. |
| 7,294,188 | B2 | 11/2007 | Shao et al. |
| 7,294,388 | B2 | 11/2007 | Lam et al. |
| 7,318,967 | B2 | 1/2008 | Hatono et al. |
| 7,338,724 | B2 | 3/2008 | Hatono et al. |
| 7,354,638 | B2 | 4/2008 | Bowles et al. |
| 7,390,561 | B2 | 6/2008 | Grinberg et al. |
| 7,393,559 | B2 | 7/2008 | Groza et al. |
| 7,488,401 | B2 | 2/2009 | Lee et al. |
| 2001/0004573 | A1 | 6/2001 | Menard et al. |
| 2004/0043243 | A1 | 3/2004 | Chen et al. |
| 2004/0164438 | A1 | 8/2004 | Lamport |
| 2004/0198866 | A1 * | 10/2004 | Sasaki ........................... 523/152 |
| 2005/0034830 | A1 * | 2/2005 | Kimura et al. ................. 162/135 |
| 2005/0064778 | A1 | 3/2005 | Lam et al. |
| 2005/0067251 | A1 | 3/2005 | Bradford, Jr. et al. |
| 2005/0072255 | A1 | 4/2005 | McCrary et al. |
| 2005/0074595 | A1 | 4/2005 | Lam |
| 2005/0075019 | A1 | 4/2005 | Lam et al. |
| 2005/0153821 | A1 | 7/2005 | Grinberg |
| 2006/0027792 | A1 | 2/2006 | Butcher et al. |
| 2007/0267604 | A1 | 11/2007 | Butcher et al. |
| 2007/0287768 | A1 | 12/2007 | Miyaji et al. |
| 2009/0048369 | A1 | 2/2009 | Newcomb et al. |

FOREIGN PATENT DOCUMENTS

| | | |
|---|---|---|
| EP | 1203897 A1 | 5/2002 |
| EP | 1750031 A2 | 2/2007 |
| WO | 9809093 A1 | 3/1998 |
| WO | 0040797 A1 | 7/2000 |
| WO | 2009055371 A2 | 4/2009 |
| WO | 2012/014055 A1 | 2/2012 |

OTHER PUBLICATIONS

PCT Search Report dated Dec. 21, 2011 for PCT/IB2011/001751 filed Jul. 29, 2011.

* cited by examiner

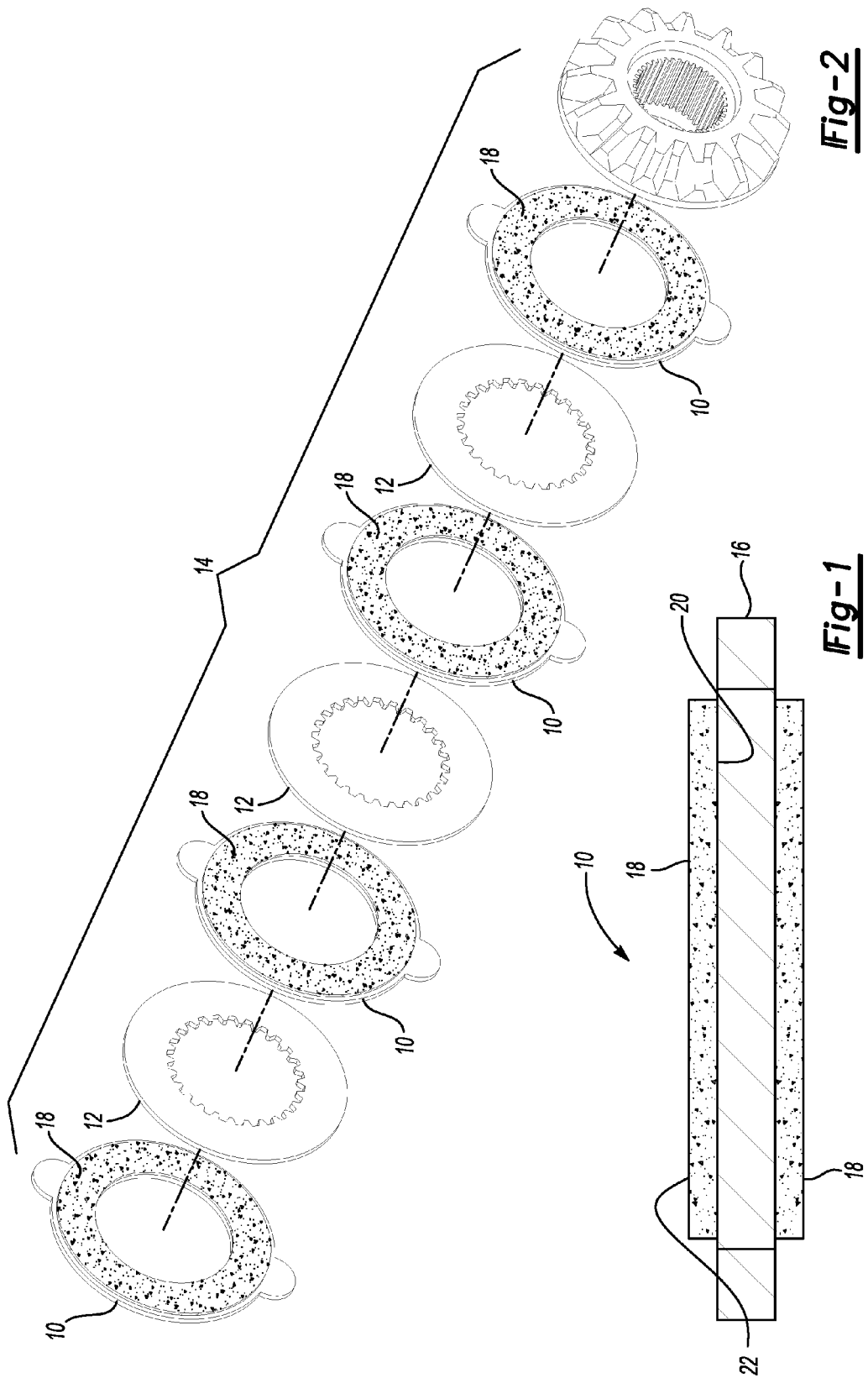

US 8,461,064 B2

FRICTION MEMBER AND FRICTION MATERIAL THEREOF

CROSS-REFERENCE TO RELATED APPLICATIONS

This application is a continuation-in-part of U.S. patent application Ser. No. 12/845,903, filed Jul. 29, 2010, which is hereby incorporated by reference in its entirety.

TECHNICAL FIELD

The present disclosure generally relates to a friction member and a friction material thereof.

BACKGROUND

Friction materials are often useful for applications where opposing surfaces engage to transmit mechanical and/or thermal energy. For example, friction materials may be disposed between opposing surfaces in brake, clutch, and torque conversion applications. Such applications often require friction materials having excellent friction stability and wear-, noise-, pressure-, and temperature-resistance.

One type of friction material, a wet friction material, may be specifically useful for applications requiring lubrication during mechanical and/or thermal energy transmission. For example, wet friction materials are often submerged in, and impregnated with, a liquid such as brake fluid, automatic transmission fluid, and/or oil during operation.

SUMMARY

A friction material includes a resin and a fibrous base material impregnated with the resin. The fibrous base material has a single ply and includes a plurality of aramid fibers present in a first amount, a plurality of polyacrylonitrile-based carbon fibers present in a second amount that is less than the first amount, and diatomaceous earth present in a third amount that is greater than the first amount. Further, the fibrous base material is substantially free from activated carbon.

In one variation, the plurality of polyacrylonitrile-based carbon fibers includes a first component having a first average length, and a second component having a second average length that is longer than the first average length.

A friction member for operatively contacting a lubricated surface includes a substrate and the friction material. The friction material defines a first surface bonded to the substrate and a second surface configured for operatively contacting the lubricated surface.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic cross-sectional illustration of a friction member including a friction material disposed on a substrate; and FIG. 2 is a schematic perspective exploded illustration of the friction member of FIG. 1 disposed between lubricated surfaces.

DETAILED DESCRIPTION

Referring to the Figures, wherein like reference numerals refer to like elements, a friction member for operatively contacting a lubricated surface 12 (FIG. 2) is shown generally at 10 in FIG. 1. The friction member 10 may be useful for applications requiring excellent friction stability, wear-resistance, noise-resistance, pressure-resistance, and temperature-resistance, as set forth in more detail below. Therefore, the friction member 10 may be useful for automotive applications including, but not limited to, clutch plates, transmission bands, brake shoes, synchronizer rings, friction discs, system plates, and limited slip differential components. However, the friction member 10 may also be useful for non-automotive applications including, but not limited to, railway brake blocks and clutch facings, multi-disc aircraft brakes, crane and elevator components, and other transportation and industrial applications.

Referring now to FIG. 2, in operation, the friction member 10 may operatively contact the lubricated surface 12 of, for example, an energy transmission device such as a limited slip differential. By way of general explanation, as described with reference to FIG. 2, a limited slip differential may minimize a difference in angular velocity of output shafts (not shown) through operation of a clutch pack, shown generally at 14. The clutch pack 14 may be encased in a housing (not shown) and lubricated with a lubricant, such as, but not limited to, a gear oil such as Dexron® LS, commercially available from BP Lubricants USA, Inc. of Wayne, N.J. In particular, the clutch pack 14 may include a plurality of lubricated surfaces 12, e.g., separator plates, spaced apart from one another, and a plurality of friction members 10, e.g., friction plates, alternatingly disposed between and opposing the plurality of lubricated surfaces 12 so that the friction members 10 may interface and interact with the lubricated surfaces 12. That is, the friction members 10 may be arranged in alternating series with the lubricated surfaces 12 within the clutch pack 14.

During operation of the clutch pack 14, the friction members 10 operatively contact the lubricated surfaces 12. For example, the friction members 10 may frictionally connect to and disconnect from adjacent lubricated surfaces 12 in response to a difference in output shaft angular velocity so that mechanical and/or thermal energy may be transmitted between the friction member 10 and the corresponding opposing lubricated surface 12. That is, the friction member 10 may compress and rub against an opposing lubricated surface 12 so as to retard movement between the friction member 10 and the lubricated surface 12 via friction. Stated differently, the friction member 10 may frictionally engage and cooperate with the lubricated surface 12 intermittently as operating conditions warrant so that lubricant may be drawn in and squeezed out of the friction member 10. In other non-limiting examples, the friction member 10 may operatively contact a brake rotor of a disc brake system or a lubricated gear of a transmission. That is, the friction member 10 may be configured as a brake pad or a synchronizer ring.

Referring now to FIG. 1, the friction member 10 includes a substrate 16. The substrate 16 may be selected according to stiffness and/or strength properties required for a desired application of the friction member 10. For example, the substrate 16 may be suitable for providing strength and rigidity to the friction member 10, as set forth in more detail below, and may be formed from a deformation-resistant metal-based material such as steel. That is, the substrate 16 may be a metal plate such as, but not limited to, a steel backing plate.

With continued reference to FIG. 1, the friction member 10 also includes a friction material 18 including a resin and a fibrous base material impregnated with the resin, as set forth in more detail below. As used herein, the terminology "fibrous base material" refers to a base layer having a single ply for use in a wet friction material 18. The fibrous base material may be a slurry composition before drying to form a wet, slurry-processed friction material 18. And, the term "wet friction material" refers to a relatively thin fibrous base layer impregnated by a resin or binder that is dried and bonded to a rigid or steel substrate 16 or backing plate. Further, wet friction materials generally operate while submerged in a lubricant and have a thickness of from about 0.3 mm to about 1.5 mm. In contrast, dry friction materials generally operate under dry contact between the friction material and an opposing friction surface, and have a thickness of from about 3 mm to about 4.5 mm.

The fibrous base material includes a plurality of aramid fibers. As used herein, the terminology "aramid" refers to aromatic polyamide fibers. The aramid fibers may be produced by a reaction between an amine group and a carboxylic acid halide group. For example, the aramid fibers may be a synthetic polyamide chain in which at least 85 parts by volume of amide linkages, i.e., an acyl group (R—C=O) bonded to a nitrogen atom (N), based on 100 parts by volume of the synthetic polyamide chain are attached directly to two aromatic rings.

The plurality of aramid fibers may be further defined as a plurality of para-aramid fibers having an average length of less than about 3 mm. That is, the plurality of aramid fibers may be short cut para-aramid fibers having a mean fiber length of about 1.4 mm and/or a bimodal mean fiber length of about 0.5 mm and about 1.4 mm. As used herein, the terminology "about" is a quantity modifier, and refers to +/−2% of the quantity being modified. The aramid fibers may be poly-(p-phenylene terephthalamide) (PPTA) produced from the monomers p-phenylene diamine (PPD) and terephthaloyl dichloride (TDC) in a co-solvent with an ionic component such as calcium chloride to occupy hydrogen bonds of the amide groups, and an organic component N-methylpyrrolidone (NMP) to dissolve the aromatic polymer. After polymer production, the resulting aramid may be dissolved in water-free sulphuric acid and spun into filament yarn. The aramid fibers may be formed by shearing and chopping the filament yarn in water so that the aramid fibers are shortened and fibrillated. As compared to other fiber types, the plurality of aramid fibers may have a low degree of fibrillation. The plurality of aramid fibers may have a density of about 1.44 g/cm$^3$. Suitable aramid fibers include Twaron® 1092 and Twaron® 1094, commercially available from Teijin Aramid GmbH of Arnhem, The Netherlands.

The plurality of aramid fibers is present in a first amount. Without intending to be limited by theory, the plurality of aramid fibers may be present in the fibrous base material to provide the fibrous base material with increased porosity, and to provide the friction member 10 with excellent strength, wear-resistance, and temperature-resistance. In particular, the aramid fibers may be present in the first amount of from about 15 parts by weight to about 35 parts by weight, e.g., about 20 parts by weight to about 30 parts by weight, based on 100 parts by weight of the fibrous base material. When the aramid fibers are present in the fibrous base material in amounts less than about 15 parts by weight, the fibrous base material may have insufficient structure and strength, and may exhibit low pressure-resistance. However, at amounts of greater than about 35 parts by weight, the fibrous base material may be difficult to process and exhibit excess porosity.

The fibrous base material also includes a plurality of polyacrylonitrile-based carbon fibers. As used herein, the terminology "polyacrylonitrile-based" refers to carbon fibers produced from a polyacrylonitrile (PAN) precursor. The polyacrylonitrile-based carbon fibers may be produced by calcining preoxidized polyacrylonitrile fiber at a temperature of greater than or equal to about 1,000° C. in an inert gas to obtain fibers having a carbon content of at least 90 parts by weight, and a bond nitrogen content of from about 1 part by weight to about 8 parts by weight based on 100 parts by weight of the fiber.

More specifically, the plurality of polyacrylonitrile-based carbon fibers may be further defined as a plurality of milled polyacrylonitrile-based carbon fibers having a first average length of less than about 1,000 microns. As used herein, the terminology "milled" refers to a carbon fiber which is shorter than a "chopped" carbon fiber. For example, the milled polyacrylonitrile-based carbon fibers may have an average first length of less than about 1,000 microns. By comparison, chopped polyacrylonitrile-based carbon fibers may have a second average length of from about 1,000 microns to about 25,000 microns. Strands of polyacrylonitrile-based carbon fiber may be milled into shorter-length polyacrylonitrile-based carbon fibers having an average first length of about 350 microns, for example. Further, the polyacrylonitrile-based carbon fibers may have an average fiber diameter of from about 7 microns to about 9 microns, and a density of from about 1.73 g/cm$^3$ to about 1.79 g/cm$^3$. Suitable polyacrylonitrile-based carbon fibers include AGM 94 polyacrylonitrile-based carbon fiber, commercially available under the identifier AGM94MF350U from Asbury Graphite Mills, Inc. of Asbury, N.J.

The plurality of polyacrylonitrile-based carbon fibers is present in a second amount that is less than the first amount. That is, the fibrous base material includes comparatively more aramid fibers than polyacrylonitrile-based carbon fibers. Without intending to be limited by theory, the plurality of polyacrylonitrile-based carbon fibers may be present in the fibrous base material to provide the friction member 10 with excellent friction stability, i.e., a stable coefficient of friction, during operation, and increased strength, increased elastic recovery, and desired temperature- and noise-resistance. That is, the friction material 18 including the polyacrylonitrile-based carbon fibers may maintain a desired frictional engagement with the opposing lubricated surface 12 to thereby decrease shuddering of the energy transmission device during operation and decrease "fade", i.e., a reduction in the coefficient of friction (μ) at high operating temperatures.

In particular, the polyacrylonitrile-based carbon fibers may be present in the second amount of from about 5 parts by weight to about 25 parts by weight, e.g., about 10 parts by weight to about 20 parts by weight, based on 100 parts by weight of the fibrous base material. When the polyacrylonitrile-based carbon fibers are present in the fibrous base material in amounts less than about 5 parts by weight, the fibrous base material may have insufficient structure and strength, and the friction member 10 may exhibit low friction stability and pressure-resistance. However, at amounts of greater than about 25 parts by weight, the fibrous base material may be difficult to process, and the friction member 10 may exhibit reduced pressure-resistance.

In one variation, the plurality of polyacrylonitrile-based carbon fibers may include a first component having the first average length, and a second component having a second average length that is longer than the first average length. The first component may be the plurality of milled polyacrylonitrile-based carbon fibers having the first average length of about 350 microns, as set forth above. The second component may be a plurality of chopped polyacrylonitrile-based carbon fibers having the second average length of about 3 mm, i.e., about 3,000 microns. Suitable chopped polyacrylonitrile-based carbon fibers include AGM 94 polyacrylonitrile-based carbon fiber, commercially available under the identifier AGM94CF3 from Asbury Graphite Mills, Inc. of Asbury, N.J.

For this variation, at least one of the first component and the second component may be present in an amount of from about 1 part by weight to about 10 parts by weight based on 100 parts by weight of the fibrous base material. For example, each of the first component and the second component may be present in the amount of 5 parts by weight based on 100 parts by weight of the fibrous base material. The second component may be present in the fibrous base material to provide the friction material 18 (FIG. 1) with increased pressure-resistance. That is, the second component may provide the friction material 18 with excellent porosity so that the lubricant may penetrate the friction material 18 during operation of the energy transmission device, yet also exhibit excellent compression set and resistance to permanent deformation during operation. The friction material 18 including the second component may be suitably compressible so that a lubricant may be squeezed into or out of the friction material 18 quickly under pressure applied by the opposing lubricated surface 12 of the energy transmission device. However, at amounts greater than about 10 parts by weight based on 100 parts by weight of the fibrous base material, the fibrous base material may be difficult to process because of entanglements caused by the comparatively-longer chopped polyacrylonitrile-based carbon fibers.

The fibrous base material also includes diatomaceous earth present in a third amount that is greater than the first amount. That is, the fibrous base material may include more diatomaceous earth than aramid fibers or polyacrylonitrile-based carbon fibers. In particular, the diatomaceous earth may be calcined diatomaceous earth having an average particle size of from about 10 microns to about 15 microns. As used herein, the terminology "calcined diatomaceous earth" refers to diatomaceous earth, i.e., sedimentary ore formed from freshwater planktonic species, that has been heat-treated, e.g., at temperatures at greater than about 800° C., to round off sharp corners of individual diatomaceous earth particles. Therefore, calcined diatomaceous earth may have reduced surface area as compared to natural, non-calcined diatomaceous earth, but increased hardness. As such, the presence of the calcined diatomaceous earth in the fibrous base material generally provides the friction material 18 (FIG. 1) with excellent pressure-resistance.

The diatomaceous earth may have a pore size of from about 0.1 micron to about 1.0 micron, and may have a porosity of greater than 80 parts by volume based on 100 parts by volume of the diatomaceous earth. Further, the diatomaceous earth may have a mean particle size of from about 10 microns to 15 microns. Suitable diatomaceous earth includes Celite® 281, commercially available from World Minerals Inc. of Santa Barbara, Calif.

The diatomaceous earth may be present in the third amount of greater than or equal to about 45 parts by weight based on 100 parts by weight of the fibrous base material. That is, the third amount may be greater than either of the first amount and the second amount. For example, the diatomaceous earth may be present in the third amount of from about 45 parts by weight to about 65 parts by weight based on 100 parts by weight of the fibrous base material.

In another variation, the diatomaceous earth may be natural amorphous diatomaceous earth. That is, the natural amorphous diatomaceous earth may not be calcinated or dried. Natural amorphous diatomaceous earth provides the fibrous base material with excellent porosity. Suitable natural amorphous diatomaceous earth includes Diafil® 230, commercially available from World Minerals Inc. of Santa Barbara, Calif. In this variation, the diatomaceous earth may be present in the third amount of from about 55 parts by weight to about 65 parts by weight based on 100 parts by weight of the fibrous base material.

The diatomaceous earth provides the friction member 10 with excellent noise-resistance. Further, diatomaceous earth may assist in resin absorption, as set forth in more detail below, and may promote lubricant flow through the friction material 18 (FIG. 1). That is, even when present in the third amount of greater than about 45 part by weight based on 100 parts by weight of the fibrous base material, the diatomaceous earth unexpectedly provides the fibrous base material with excellent noise-resistance without detrimentally affecting the structure and strength of the fibrous base material. In particular, when present in the fibrous base material in the third amount of greater than 45 parts by weight based on 100 parts by weight of the fibrous base material, the diatomaceous earth increases the dynamic coefficient of friction and reduces the static coefficient of friction of the friction member 10. Therefore, the friction member 10 including the diatomaceous earth present in the aforementioned third amount has an optimized slope of a $\mu$-v curve. In particular, the slope of a $\mu$-v curve represents a variation in coefficient of friction ($\mu$) compared to a variation in sliding speed (v). For frictional applications, a positive slope is desired over a range of speeds to be controlled by the friction member 10 so as to decrease shudder, i.e., frictional vibration, within the energy transmission device. For example, the friction member 10 may decrease shuddering during braking or gear shifting.

Stated differently, the friction member 10 including the friction material 18 has increased noise-resistance. That is, the friction material 18 generates a desired torque curve having a shape defined by a positive $\mu$-v slope so that the friction material 18 is substantially noise- or squawk-free during operation.

The fibrous base material may further include latex. Latex may be present in the fibrous base material as a saturant and processing aid, and may generally provide the fibrous base material with flexibility. Latex may also coat the aramid fibers and/or polyacrylonitrile-based carbon fibers to provide the fibrous base material with sufficient wet strength, i.e., web strength, for processability. The latex may be in the form of an aqueous dispersion, e.g., a medium acrylonitrile, acrylonitrile-butadiene copolymer formed by emulsion polymerization. That is, the latex may be a nitrile latex emulsion that is acrylonitrile-based. Further, the latex may have a Brookfield viscosity of about 15 cP at 25° C. The latex may be present in an amount of from about 1 part by weight to about 6 parts by weight, e.g., 3 parts by weight, based on 100 parts by weight of the fibrous base material. Suitable latex may include Hycar® 1562×117 latex, commercially available from Emerald Performance Materials LLC of Akron, Ohio.

In one variation, the fibrous base material may also include a plurality of cellulose fibers. The cellulose fibers may include high alpha-cellulose cotton, wood pulps, linen, rag, and combinations thereof. The cellulose fibers may have an average length of from about 2 mm to about 4 mm and an average diameter of from about 25 microns to about 35 microns. The cellulose fibers generally provide the fibrous base material with structure and strength. The plurality of cellulose fibers may be present in an amount of from about 5 parts by weight to about 15 parts by weight based on 100 parts by weight of the fibrous base material. For this variation, at amounts less than about 5 parts by weight, the structural integrity of the fibrous base material may be diminished, and at amounts greater than about 15 parts by weight, the fibrous base material may exhibit low thermal resistance. Suitable cellulose fibers include 225HS cellulose fiber, commercially available from Buckeye Technologies Inc. of Memphis, Tenn.

The fibrous base material is substantially free from activated carbon. As used herein, the terminology "activated carbon" refers to any form of carbon processed by physical reactivation and/or chemical reactivation to have excellent porosity and high surface area. Activated carbon may be referred to as, but not limited to, powdered activated carbon, granular activated carbon, extruded activated carbon, impregnated carbon, pyrolyzed carbon, and combinations thereof. That is, activated carbon may refer to pyrolyzed carbon, i.e., any carbon that undergoes pyrolysis. Further, activated carbon generally refers to activated carbon particles, rather than carbon fibers. Activated carbon, e.g., pyrolyzed carbon, is generally costly, may contribute to noise generation, and may generate wear debris and discolor and/or degrade lubricants.

Therefore, since the fibrous base material is substantially free from activated carbon, the friction member 10 including the friction material 18 has increased wear-resistance and is economical to produce. That is, the friction member 10 exhibits decreased degradation from abrasion and shear stress during operation of the energy transmission device, and performs suitably when wetted by a lubricant.

As set forth above, the fibrous base material is impregnated with the resin. The resin impregnates the fibrous base material to provide the friction material 18 with mechanical shear strength, temperature-resistance, and friction stability. The resin also counterbalances the presence of the diatomaceous earth in the friction material 18 and contributes to the enhanced friction stability of the friction material 18. Therefore, the resin may be a saturant and/or binder, and may have a viscosity of from about 90 cP to about 160 cP at 25° C. The resin may be any suitable resin selectable according to a desired application of the friction material 18. For example, the resin may be a phenol resin. In another variation, the resin may be a polyimide resin. Yet in other variations, the resin may be an epoxy- or oil-modified phenolic resin, silicone resin, mixtures of resins, multiple resin systems, and combinations thereof.

The fibrous base material may be impregnated with the resin at a resin pick-up of from about 20 parts by weight to about 100 parts by weight, e.g., about 40 parts by weight to about 75 parts by weight, based on 100 parts by weight of the fibrous base material. That is, the percent of resin pick-up by the fibrous base material, i.e., a weight percent of the resin based on the weight of the dry fibrous base material, may range from about 20% to about 100%. At resin amounts below about 20 parts by weight, the fibrous base material may not exhibit sufficient strength, and at resin amounts greater than about 100 parts by weight, the fibrous base material may be oversaturated so that the friction material 18 exhibits poor porosity and lubricant absorption, resulting in glazing and noise, vibration, and harshness (NVH) sensitivity. Further, the aforementioned resin pick-up contributes to the excellent noise-resistance and pressure-resistance of the friction material 18 by coating the fibrous base material. A suitable resin may include ASKOFEN 295 E 60, commercially available from Ashland-Südchemie-Kernfest GmbH (ASK Chemicals) of Hilden, Germany.

The friction material 18 may be formed via any processing system capable of mixing the plurality of aramid fibers, the plurality of polyacrylonitrile-based carbon fibers, and diatomaceous earth. For example, the friction material 18 may be formed via drylaid, airlaid, coform, or wetlaid fiber processes and coated, saturated, and slurry-impregnated resin addition processes. Further, the friction material 18 may be produced on paper machines and resin saturation equipment recognizable to one skilled in the art.

By way of a non-limiting example, a process for forming the friction material 18 may include combining the plurality of aramid fibers, plurality of polyacrylonitrile-based carbon fibers, diatomaceous earth, and optional latex and plurality of cellulose fibers with water to form a slurry. The slurry may be pumped to a forming wire of a paper machine. Generally, the forming wire may define a plurality of openings configured for draining the water in the slurry. During processing, water in the slurry drains through the openings, and the remaining wet paper is carried to a drying section of the paper machine so that any remaining water may be removed by drying to thereby form dried paper, i.e., the fibrous base material.

The fibrous base material may then be impregnated and saturated by the resin by, for example, immersion, surface coating, or spray saturating. The impregnated fibrous base material, i.e., the friction material 18, is dried to a "B" stage semi-cured state, rolled onto a reel, and sheeted to desired dimensions. The formed friction material 18 may have a basis weight of from about 60 lbs/3,000 ft$^2$ to about 400 lbs/3,000 ft$^2$. For example, the friction material 18 may have a basis weight of from about 125 lbs/3,000 ft$^2$ to about 200 lbs/3,000 ft$^2$. The friction material 18 may have a thickness of from about 12 mils to about 60 mils, e.g., from about 21 mils to about 32 mils, where 1 mil is equal to 0.0254 mm. Further, the friction material 18 may have a density of from about 4.5 lbs/3,000 ft$^2$/0.001 in to about 6.5 lbs/3,000 ft$^2$/0.001 in, e.g., from about 5.9 lbs/3,000 ft$^2$/0.001 in to about 6.3 lbs/3,000 ft$^2$/0.001 in.

The friction material 18 has a single ply. As used herein, the terminology "ply" refers to a single layer of the friction material 18. That is, the friction material 18 is not multi-layered and does not include two or more plies. Rather, the friction material 18 may be in the form of a sheet having a single ply. Therefore, the friction material 18 advantageously exhibits reduced delamination from the substrate 16 during operation, and thus contributes to the excellent wear-resistance of the friction member 10.

Referring again to FIG. 1, for the friction member 10, the friction material 18 defines a first surface 20 bonded to the substrate 16 and a second surface 22 configured for operatively contacting the lubricated surface 12 (FIG. 2). The first surface 20 of the friction material 18 may be bonded to the substrate 16 by way of, for example, a phenolic adhesive sheet and/or subjecting the impregnated friction material 18 to pressure and/or temperature to bond the friction material 18 to the substrate 16 by way of the resin. And, during operation, the second surface 22 may operatively contact, e.g., frictionally connect to and disconnect from adjacent lubricated surfaces 12 so as to compress and rub against an opposing lubricated surface 12. That is, the friction member 10 may frictionally engage and cooperate with the lubricated surface 12 intermittently as operating conditions warrant so that lubricant may be drawn in and squeezed out of the friction member 10.

Therefore, the friction material 18 may be penetrable by the aforementioned lubricant during operation. However, the friction material 18 may be compatible with any suitable lubricant, including oils and transmission fluids formulated with additives to minimize thermal breakdown of the lubricant.

Further, as shown in FIG. 1, the friction material 18 may be bonded to multiple surfaces of the substrate 16. That is, by way of non-limiting examples, the friction material 18 may be bonded to opposing surfaces or sides of the substrate 16 for operatively contacting two adjacent lubricated surfaces 12. For example, although not shown in FIG. 2, the friction material 18 may be disposed on and bonded to two surfaces of the substrate 16, e.g., a "front" and "back" of the substrate 16, so as to be sandwiched between and operatively contact two adjacent lubricated surfaces 12. Alternatively, the friction material 18 may only be bonded to a single surface of the substrate 16.

Moreover, for applications including the clutch pack 14 of FIG. 2, it is to be appreciated that the plurality of friction members 10 may be arranged in any configuration within the clutch pack 14. In addition, each of the plurality of friction members 10, e.g., friction plates, and the plurality of lubricated surfaces 12, e.g., separator plates, may include the friction material 18 bonded to the substrate 16. That is, although not shown in FIG. 2, the plurality of lubricated surfaces 12 may also include the friction material 18.

The friction material 18 may have any suitable size and/or shape. For example, the friction material 18 may have an annular or full ring shape as shown in FIG. 2. Alternatively, although not shown, the friction material 18 may be segmented into shapes including, but not limited to, arcs, strips, wedges, and combinations thereof. The friction material 18 may also define a plurality of molded and/or cut grooves, i.e., channels, therein (not shown) so as to optimize lubricant flow during operation.

The following examples are meant to illustrate the disclosure and are not to be viewed in any way as limiting to the scope of the disclosure.

EXAMPLES

To form the friction materials of each of Examples 1-3, components A-J are combined with water in the amounts listed in Table 1 to form a slurry. The amounts of Components A-J listed in Table 1 refer to parts by weight based on 100 parts by weight of the fibrous base material. The slurry is pumped to a forming wire of a paper machine, and water in the slurry drains through openings defined by the forming wire to form a wet paper. The wet paper is carried to a drying section of the paper machine and water is further removed by drying to thereby form dried paper, i.e., a fibrous base material of each of Examples 1-3. Each fibrous base material is then saturated with Resin K at the resin pick-up listed in Table 1 to form a friction material of each of Examples 1-3.

TABLE 1

Friction Material Compositions

|  | Ex. 1 | Ex. 2 | Ex. 3 |
| --- | --- | --- | --- |
| Component A | 30 | — | 20 |
| Component B | — | 30 | — |
| Component C | 10 | 20 | 5 |
| Component D | — | — | 5 |
| Component E | 57 | 47 | — |
| Component F | — | — | 57 |
| Component G | 3 | 3 | 3 |
| Component H | — | — | 10 |
| Component J | — | — | — |
| Total | 100 | 100 | 100 |
| Resin K | 66.7 | 66.7 | 66.7 |

Component A is Twaron® 1092 aramid fibers commercially available from Teijin Aramid GmbH of Arnhem, The Netherlands;

Component B is Twaron® 1094 aramid fibers commercially available from Teijin Aramid GmbH of Arnhem, The Netherlands;

Component C is AGM 94 milled polyacrylonitrile-based carbon fibers having a first average length of 350 microns and commercially available under the identifier AGM94MF350U from Asbury Graphite Mills, Inc. of Asbury, N.J.;

Component D is AGM 94 chopped polyacrylonitrile-based carbon fibers having a second average length of 3 mm and commercially available under the identifier AGMCF3 from Asbury Graphite Mills, Inc. of Asbury, N.J.;

Component E is Celite® 281 calcined diatomaceous earth commercially available from World Minerals Inc. of Santa Barbara, Calif.;

Component F is Diafil® 230 natural amorphous diatomaceous earth commercially available from World Minerals Inc. of Santa Barbara, Calif.;

Component G is Hycar® 1562×117 latex commercially available from Emerald Performance Materials LLC of Akron, Ohio;

Component H is 225HS cellulose fiber commercially available from Buckeye Technologies Inc. of Memphis, Tenn.;

Component J is 5500 series activated carbon commercially available from Asbury Graphite Mills, Inc. of Asbury, N.J.; and Resin K is ASKOFEN 295 E 60 phenol resin commercially available from Ashland-Südchemie-Kernfest GmbH (ASK Chemicals) of Hilden, Germany.

The friction material of Comparative Example 4 is a carbon fiber-reinforced plastic friction material. The friction material of Comparative Example 4 includes a fibrous base material including woven carbon fiber embedded in a synthetic matrix. In addition, the friction material of Comparative Example 4 includes thermosetting plastics as a binding component.

The friction material of Comparative Example 5 is a carbon fiber-reinforced carbon friction material. The friction material of Comparative Example 5 includes a fibrous base material including woven carbon fiber and pyrolytic carbon produced by chemical vapor deposition of hydrocarbon gas.

The resulting friction material of each of Examples 1-3 and Comparative Examples 4 and 5 has a thickness of 16 mils. Each friction material is bonded to respective steel backing plate substrates with a phenolic neoprene adhesive at 232° C. for 1 minute to form the friction members of Examples 1-3 and Comparative Examples 4 and 5.

Vertical Friction Testing

The friction materials of each of Examples 1 and 3 and Comparative Examples 4 and 5 are evaluated for noise-resistance on a Vertical Friction Test Machine. For each of the friction members of Examples 1 and 3 and Comparative Examples 4 and 5, a limited slip differential including a clutch preloading mechanism and a plurality of respective friction members is assembled. Each of the friction members is rotated under loads in each of Gear Oil M and Gear Oil N at 100° C. against stationary steel separator plates at a constant slip speed of 40 rpm (revolutions per minute) for a time period corresponding to a key lifetime of the respective limited slip differential. At periodic intervals, each of the friction members is rotated at from 0 rpm to 20 rpm and evaluated for noise-resistance. A coefficient of friction for each friction material is also measured as a function of slip speed. In addition, a μ-v curve is generated for each friction material and the slope of each μ-v curve, i.e., the frictional slope, is calculated and noted as having a positive or negative direction, as summarized in Table 2.

The frictional slope of each friction material is defined as a ratio of a change in the coefficient of friction, i.e., the delta coefficient of friction, and a dynamic coefficient of friction. Further, the delta coefficient of friction is defined as a difference between the dynamic coefficient of friction and the static coefficient of friction of the respective friction material. When the dynamic coefficient of friction is greater than the static coefficient of friction, the slope of the μ-v curve is positive. Conversely, when the static coefficient of friction is greater than the dynamic coefficient of friction, the slope of the μ-v curve is negative. A friction material having a comparatively larger positive slope exhibits better noise-resistance than a friction material having either a comparatively smaller positive slope or a negative slope.

Gear Oil M is Dexron® LS 75W-90 gear oil commercially available from General Motors Incorporated of Detroit, Mich.; and Gear Oil N is Texaco® 2276 gear oil commercially available from Chevron Products Company of San Ramon, Calif.

TABLE 2

Frictional Slopes of Friction Materials

|  | Ex. 1 | Ex. 3 | Comp. Ex. 4 | Comp. Ex. 5 |
| --- | --- | --- | --- | --- |
| Frictional Slope in Gear Oil M (direction, value) | Positive, 0.22 | Positive, 0.21 | Positive, 0.18 | Positive, 0.11 |
| Frictional Slope in Gear Oil N (direction, value) | Positive, 0.15 | Positive, 0.15 | Negative, −0.01 | Negative, −0.05 |

As shown by the results listed in Table 2, each of the friction materials of Examples 1 and 3, which includes greater than 45 parts by weight diatomaceous earth based on 100 parts by weight of the friction material and is substantially free from activated carbon, has a positive frictional slope direction, and therefore exhibits no noise when tested in either of Gear Oil M or Gear Oil N in accordance with the aforementioned procedure. In contrast, each of the friction materials of Comparative Examples 4 and 5, which does not include any diatomaceous earth and includes pyrolyzed carbon, has a positive frictional slope direction when tested in Gear Oil M and a negative frictional slope direction when tested in Gear Oil N. Further, the frictional slope value of each of the friction materials of Examples 1 and 3 is greater than the frictional slope value of each of the friction materials of Comparative Examples 4 and 5 when tested in either of Gear Oil M or Gear Oil N. As such, the friction materials of each of Examples 1 and 3 exhibit greater noise-resistance than the friction materials of each of Comparative Examples 4 and 5.

Each of the friction materials of Examples 1 and 3 and Comparative Examples 4 and 5 is also evaluated for thickness loss by comparing an initial thickness of each friction material to a final thickness of each friction material. A maximum acceptable thickness loss for each friction material tested in accordance with the aforementioned vertical friction test procedure is 15% of the respective initial thickness. The results of the thickness loss evaluation are summarized below in Table 3.

TABLE 3

Friction Material Thickness Loss

|  | Ex. 1 | Ex. 3 | Comp. Ex. 4 | Comp. Ex. 5 |
| --- | --- | --- | --- | --- |
| Thickness Loss in Gear Oil M (%) | 6.4 | 11.5 | 7.0 | 8.5 |
| Thickness Loss in Gear Oil N (%) | 4.5 | 4.9 | 3.6 | 2.7 |

As shown by the results listed in Table 3, each of the friction materials of Examples 1 and 3 and Comparative Examples 4 and 5 exhibits a thickness loss of less than 15% of the initial thickness of the respective friction material. Therefore, each of the friction materials exhibits acceptable thickness loss and wear-resistance when tested in accordance with the aforementioned vertical friction test procedure.

μ P v T Testing

The friction materials of Examples 1-3 and Comparative Examples 4 and 5 are evaluated for noise-resistance on an SAE No. 2 Universal Wet Friction Test Machine according to the SAE J2490 test method for 24 hours. For the test method, the lubricant is gear oil, and the reaction plates, i.e., lubricated surfaces, are steel clutch plates. A μ-v curve is generated for each friction material and the slope of each μ-v curve is noted as positive or negative, as summarized in Table 4. A friction material that has a positive μ-v slope curve passes the aforementioned μ P v T test. That is, higher coefficients of friction and descending μ-v curve shapes are desirable and correlated to higher noise-resistance, i.e., quieter operation, of the friction material.

TABLE 4

Noise-Resistance and Thermal-Resistance of Friction Materials

|  | Ex. 1 | Ex. 2 | Ex. 3 | Comp. Ex. 4 | Comp. Ex. 5 |
| --- | --- | --- | --- | --- | --- |
| μ-v curve slope | Positive | Positive | Positive | Negative | Negative |
| Noise-resistance | Acceptable | Acceptable | Acceptable | Not Acceptable | Not Acceptable |

As shown by the results listed in Table 4, each of the μ-v curves of the friction materials of Examples 1-3 has a positive slope. Therefore, each of the friction materials of Examples 1-3, which include greater than 45 parts by weight diatomaceous earth based on 100 parts by weight of the friction material and are substantially free from activated carbon, passes the aforementioned test. That is, the friction materials of Examples 1-3 have higher coefficients of friction and descending μ-v curve slopes as compared to the friction materials of Comparative Examples 4 and 5. In contrast, each of the μ-v curves of the friction materials of Comparative Examples 4 and 5 has a negative slope. Therefore, the friction materials of Comparative Examples 4 and 5, which do not include any diatomaceous earth and include pyrolyzed carbon, do not pass the aforementioned test. Therefore, the friction materials of Examples 1-3 exhibit increased noise-resistance as compared to the friction materials of Comparative Examples 4 and 5, and have an increasing coefficient of friction as slip speed increases.

While the best modes for carrying out the disclosure have been described in detail, those familiar with the art to which this disclosure relates will recognize various alternative designs and embodiments for practicing the disclosure within the scope of the appended claims.

The invention claimed is:

1. A friction material comprising:
   a resin; and
   a fibrous base material impregnated with the resin and having a single ply, the fibrous base material including;
      a plurality of aramid fibers present in a first amount;
      a plurality of polyacrylonitrile-based carbon fibers present in a second amount that is less than the first amount; and
   diatomaceous earth present in a third amount that is greater than or equal to 47 parts by weight based on 100 parts by weight of the fibrous base material;

wherein the fibrous base material is substantially free from activated carbon.

2. The friction material of claim 1, wherein the diatomaceous earth is calcined diatomaceous earth having an average particle size of from about 10 microns to about 15 microns.

3. The friction material of claim 2, wherein the third amount is from about 55 parts by weight to about 65 parts by weight based on 100 parts by weight of the fibrous base material.

4. The friction material of claim 2, wherein the first amount is from about 15 parts by weight to about 35 parts by weight based on 100 parts by weight of the fibrous base material.

5. The friction material of claim 1, wherein the plurality of polyacrylonitrile-based carbon fibers is further defined as a plurality of milled polyacrylonitrile-based carbon fibers having a first average length of less than about 1,000 microns.

6. The friction material of claim 2, wherein the second amount is from about 5 parts by weight to about 25 parts by weight based on 100 parts by weight of the fibrous base material.

7. The friction material of claim 1, wherein the fibrous base material is impregnated with the resin at a resin pick-up of from about 20 parts by weight to about 100 parts by weight based on 100 parts by weight of the fibrous base material.

8. A friction material comprising:
a resin; and
a fibrous base material impregnated with the resin and having a single ply, the fibrous base material including;
a plurality of aramid fibers present in a first amount;
a plurality of polyacrylonitrile-based carbon fibers present in a second amount that is less than the first amount and including;
a first component having a first average length; and
a second component having a second average length that is longer than the first average length; and
diatomaceous earth present in a third amount that is greater than or equal to 47 parts by weight based upon 100 parts by weight of the fibrous base material;
wherein the fibrous base material is substantially free from activated carbon.

9. The friction material of claim 8, wherein the diatomaceous earth is natural amorphous diatomaceous earth.

10. The friction material of claim 8, wherein the third amount is from about 55 parts by weight to about 65 parts by weight based on 100 parts by weight of the fibrous base material.

11. The friction material of claim 8, wherein the first component is a plurality of milled polyacrylonitrile-based carbon fibers having the first average length of about 350 microns.

12. The friction material of claim 11, wherein the second component is a plurality of chopped polyacrylonitrile-based carbon fibers having the second average length of about 3 mm.

13. The friction material of claim 10, further including a plurality of cellulose fibers present in an amount of from about 5 parts by weight to about 15 parts by weight based on 100 parts by weight of the fibrous base material.

14. A friction member for operatively contacting a lubricated surface, the friction member comprising:
a substrate; and
a friction material defining a first surface bonded to the substrate and a second surface configured for operatively contacting the lubricated surface, the friction material including;
a resin; and
a fibrous base material impregnated with the resin and having a single ply, the fibrous base material including;
a plurality of aramid fibers present in a first amount;
a plurality of polyacrylonitrile-based carbon fibers present in a second amount that is less than the first amount; and
diatomaceous earth present in a third amount that is greater than or equal to 47 parts by weight based on 100 parts by weight of the fibrous base material;
wherein the fibrous base material is substantially free from activated carbon.

15. The friction material of claim 3, wherein the first amount is from about 15 parts by weight to about 35 parts by weight based on 100 parts by weight of the fibrous base material.

16. The friction material of claim 15, wherein the second amount is from about 5 parts by weight to about 25 parts by weight based on 100 parts by weight of the fibrous base material.

17. The friction material of claim 12, wherein the second amount is from about 10 parts by weight to about 20 parts by weight based on 100 parts by weight of the fibrous base material.

18. The friction material of claim 17, wherein the first amount is from about 20 parts by weight to about 30 parts by weight based on 100 parts by weight of the fibrous base material.

19. The friction material of claim 13, wherein the first amount is from about 20 parts by weight to about 30 parts by weight based on 100 parts by weight of the fibrous base material, and the second amount is from about 10 parts by weight to about 20 parts by weight based on 100 parts by weight of the fibrous base material.

20. The friction material of claim 1,
wherein the first amount is from about 20 parts by weight to about 30 parts by weight based on 100 parts by weight of the fibrous base material;
wherein the second amount is from about 10 parts by weight to about 20 parts by weight based on 100 parts by weight of the fibrous base material;
wherein the third amount is from 47 parts by weight to about 57 parts by weight based on 100 parts by weight of the fibrous base material; and
wherein the friction material further includes:
latex present in an amount of from about 1 part by weight to about 6 parts by weight based on 100 parts by weight of the fibrous base material; and
a plurality of cellulose fibers present in an amount of from about 5 parts by weight to about 15 parts by weight based on 100 parts by weight of the fibrous base material.

* * * * *